United States Patent
Ding

(10) Patent No.: US 7,221,355 B1
(45) Date of Patent: May 22, 2007

(54) POINTING DEVICE FOR A PEN LOCATOR SYSTEM INCLUDING LOW STANDBY POWER ELECTRONIC CIRCUIT

(75) Inventor: Yao Ding, Sunnyvale, CA (US)

(73) Assignee: Luidia Inc., San Carlos, CA (US)

( * ) Notice: Subject to any disclaimer, the term of this patent is extended or adjusted under 35 U.S.C. 154(b) by 541 days.

(21) Appl. No.: 10/751,217

(22) Filed: Dec. 31, 2003

(51) Int. Cl.
*G09G 5/00* (2006.01)
(52) U.S. Cl. .................... 345/156; 345/169
(58) Field of Classification Search ............. 345/156, 345/157, 158–176, 179, 180–184
See application file for complete search history.

(56) References Cited

U.S. PATENT DOCUMENTS 6,781,570 B1 * 8/2004 Arrigo et al. ............... 345/158
7,084,860 B1 * 8/2006 Jaeger et al. ............... 345/173
2004/0056849 A1 * 3/2004 Lohbihler et al. .......... 345/173
2005/0228320 A1 * 10/2005 Klinghult .................... 601/46

* cited by examiner

Primary Examiner—Nitin I. Patel
(74) Attorney, Agent, or Firm—Dov Rosenfeld Inventek

(57) ABSTRACT

A portable transmitter having no power consumption while inactive, and a nearly simultaneous indicator of the cause of a transition when power is provided. A transmitter pen in a locator system, having more than one sensor, each separately triggerable, and indicating which sensor was triggered. An on-off circuit coupled to a 1.5 volt battery power source, to a power regulator and multiple sensors, so the regulator consumes no power while inactive. The on-off circuit consumes no power while inactive. When one of the sensors is triggered, the on-off circuit activates, while indicating which sensor was triggered. The circuit has an ON state, in which the regulator and operational circuits operate normally, an IDLE state, in which the circuit consumes little power in anticipation of being activated, and a SHUT-DOWN state, in which the circuit consumes little power in anticipation of a sensor being released.

23 Claims, 4 Drawing Sheets

POINTING DEVICE FOR A PEN LOCATOR SYSTEM INCLUDING LOW STANDBY POWER ELECTRONIC CIRCUIT

BACKGROUND OF THE INVENTION

1. Field of the Invention

The invention relates to a low standby power circuit used in a pointing device, such as might be used in a locator system.

2. Related Art

Locator systems, such as those available from Luidia, Inc., of San Carlos, California, the assignee of the present invention, include a pointing device capable of being moved about, and a matching device for detecting the position of the pointing device by signals sent from one device to the other. The device made by Luidia includes a transmitter in the pointing device, and one or more receivers capable of receiving signals from the transmitter and interpreting the location of the transmitter in response to those signals. In the remainder of the discussion, such a configuration will be assumed, although those in the art will understand that the inventive aspects may also be applied to a system wherein the pointing device receives signals from one or more matching devices to determine the location.

As an example, the pointing device containing the transmitter might be shaped like a marker pen or other drawing tool (sometimes called a "transmitter pen") with the matching device (the receiver(s)) deriving the location of the pointing device on a planar surface (sometimes called an "active area" in which position detection might occur), e.g., in response to signals from the transmitter in the pointing devices. In such systems, the matching device, e.g., receiver might send signals to a display, or to another communication or computing system, with the effect that movement of the transmitter pen would have the effect of drawing or writing on both the active area and also in storage in the connected device, and/or displayed on a display system. When the active area itself includes a projection screen used with a display projector coupled to the connected device, the transmitter pen need not have any actual ink or other marking material, as the drawing can be done by using the display projector to show annotations on the screen.

A first problem with known systems is that the pointing device, e.g., transmitter pen includes electronic circuitry, e.g., circuitry capable of transmitting signals to the matching device, e.g., receiver(s), with the effect that the pointing device consumes electrical power. The electrical power for the pointing device might be supplied from a battery, but this has the drawbacks (1) that the electrical power would be wasted while the pointing device is not in active use, and (2) that the battery would eventually have to be replaced or recharged.

Although some known systems, such as for example computer monitors, do include circuitry for operating in a reduced-power mode when relatively inactive, such known systems are subject to several drawbacks as well as follows:

(1) Circuitry for operating in a reduced-power mode under selected conditions is more complex and often more expensive than circuitry without that capability.

(2) Even operating in a reduced-power mode, such known circuitry typically uses an amount of power that is more than insignificant, albeit much lower than would be used in a regular operational mode, with the effect that the reduced-power mode does waste at least some power and can eventually cause the battery to be replaced or recharged.

(3) Known circuitry for operating in a reduced-power mode still involves supplying power for the reduced-power mode, with this power involving more than the voltage supplied by a battery. For example, many microelectronic circuits operate at voltages such as 3.3 volts or 5.0 volts, even in reduced-power mode, while non-lithium based battery power is lower than that, e.g., only 1.5 volts using a carbon-zinc battery. Such known circuitry accordingly involves a DC-to-DC converter between the battery and the voltage used by the microelectronic circuit, and the DC-to-DC converter itself draws an amount of power that is more than insignificant, with the effect that the battery can be drained relatively rapidly even when the reduced-power mode for the microelectronic circuit is quite efficient.

(4) Known circuitry for operating in a reduced power mode with DC-to-DC converter involved can only transition from an inactive state to an active state from a single source, e.g., the function switch or power switch.

(5) Known circuitry for operating in a reduced-power mode often involves a delay in fully operational capability, sometimes called warm-up time, during which the circuitry might fail to operate as it would have if fully on at all times.

A pointing device, e.g., transmitter pen might have more than one way to transition from its inactive state to an active state, with the effect that it would be advantageous to provide, with any transition from a no-power mode to a powered mode, information regarding which way that transition was triggered, such as for example which one of a set of passive sensors was invoked to cause the transition. In locator systems including a pointing device, e.g., transmitter pen and a mechanism to make an area active for position detection, e.g. one or more receivers (such as those available from Luidia), the pointing device, e.g., transmitter pen might include a first sensor capable of detecting when the pointing device is touched to the active area for writing, and one or more additional sensors capable of activating other features. In one embodiment, these additional sensors can operate in a manner similar to mouse buttons. These additional sensors might alternatively be used with the effect of adjusting the characteristics of the display in the case that the positions detected are displayed, such as for example the color of a displayed line, whether a displayed line is dashed or dotted or not, and the like.

Known circuitry for operating in a reduced-power mode does not provide both (1) a state in which essentially no power is used (a "no-power" state), and (2) any substantial information, when transitioning to an active state from that no-power state, about passive sensors that might have been triggered while in that no-power state. This has the effect that if there is more than one way to transition to active state, circuitry that is transitioned to the active state does not have any convenient way to tell which way that transition was triggered.

For example, with known circuitry for operating in a reduced-power mode, if there are multiple buttons or switches (or other types of sensors) to turn the power on, either (1) the known circuitry involves an amount of power drain so that the known circuitry can detect which one was used to turn the power on, or (2) the known circuitry does not know which one of the multiple buttons or switches was used to turn the power on. In some known circuitry, either (A) the power drain is from the DC-to-DC converter stays on, for the purpose of providing power to a microcontroller, so the microcontroller can detect which switch was used to turn the power on, or (B) the power drain is from the microcontroller itself, which stays on in a reduced-power mode, using a higher-voltage source than a 1.5 volt battery, for the purpose of detecting which switch was used to turn the power on.

Accordingly, it would be advantageous to provide a technique providing substantially no power consumption in a relatively inactive state, while also providing a substantially immediate indicator of the cause of a transition to an active state when power is provided.

SUMMARY OF THE INVENTION

The invention provides methods and systems including a portable pointing device having substantially no power consumption in a relatively inactive state, having more than one way to transition to an active state, and also providing a substantially immediate indicator of the cause of a transition to an active state when power is provided. These methods and systems include a battery with substantially less voltage, or substantially less voltage stability, than used by a microcontroller, and a DC-to-DC converter (herein sometimes called a "power regulator" or a "regulator") capable of coupling the battery to the microcontroller. In the relatively inactive state, the regulator is substantially off, with the effect that the regulator (and the rest of the circuit) consumes substantially no power. When one of a set of multiple buttons or switches is triggered while the power is substantially off, the methods and systems include having the circuit able to determine which one of those multiple buttons or switches was triggered to turn the power on.

In one embodiment, the system includes a pointing device, e.g., a transmitter pen in a locator system, having more than one button or sensor, each capable of transitioning the pointing device, e.g., transmitter pen from a relatively inactive state to an active state, and the system substantially immediately providing an indicator of which of those buttons or sensors was the one causing the transition.

In one aspect of the invention, an on-off circuit is coupled to a power source and to both a power regulator and a set of substantially passive sensors, with the effect that the on-off circuit can cause the power regulator (and any operational circuits) to consume substantially no power in an inactive state. The on-off circuit itself also consumes essentially no power in its inactive state. When one of the sensors is activated (such as by pushing a button), the on-off circuit can act in response to that sensor, such as by entering its active state, while substantially immediately providing an indicator of which of the sensors was activated.

In one embodiment, the pointing device has an inactive state, in which it consumes substantially no power, and an on state, in which the pointing device operates normally, e.g., transmitting signals, such that the power regulator and operational circuit are operating normally. In this embodiment, the pointing device also has at least (A) an idle state, in which the pointing device consumes little power, but still a finite non-zero amount, in anticipation of being activated relatively soon, and able to quickly switch to the on state, and (B) a shut down state, in which the pointing device also consumes little power, but still a finite non-zero amount, and is able to transition to the on state, and applicable in the case that a sensor is held on for a relatively extended time duration, in anticipation of the sensor being released relatively soon. In such an embodiment, the pointing device is able to consume less than 1.5 microamp (µA) in its inactive state, in comparison with between about 10 and about 15 milliamps (mA) in its on state, while still providing an indicator of which sensor was activated within a time duration of under 30 milliseconds (ms).

In one embodiment, the shut-down state provides the pointing device with the capability of having a substantially insignificant "warm up" time of between about 20 ms and about 30 ms, when a button is stuck on or otherwise continuously triggered.

After reading this application, those skilled in the art would recognize that the techniques described herein provide an enabling technology, with the effect that heretofore advantageous features can be provided that heretofore were substantially infeasible.

For example, not intended to be limiting in any way, the techniques described herein provide a pointing device (e.g., a transmitter pen) with the capability of remaining untended for relatively long periods of time without having to recharge or replace its batteries.

For example, not intended to be limiting in any way, the techniques described herein provide a pointing device, e.g., a transmitter pen with a plurality of passive activators (such as buttons or sensors), with the simultaneous capability of using essentially no power when inactive, and of being able to distinguish which of the plurality of passive activators was the one which brought the device out of its inactive state.

INCORPORATED DISCLOSURES

Figure 1:
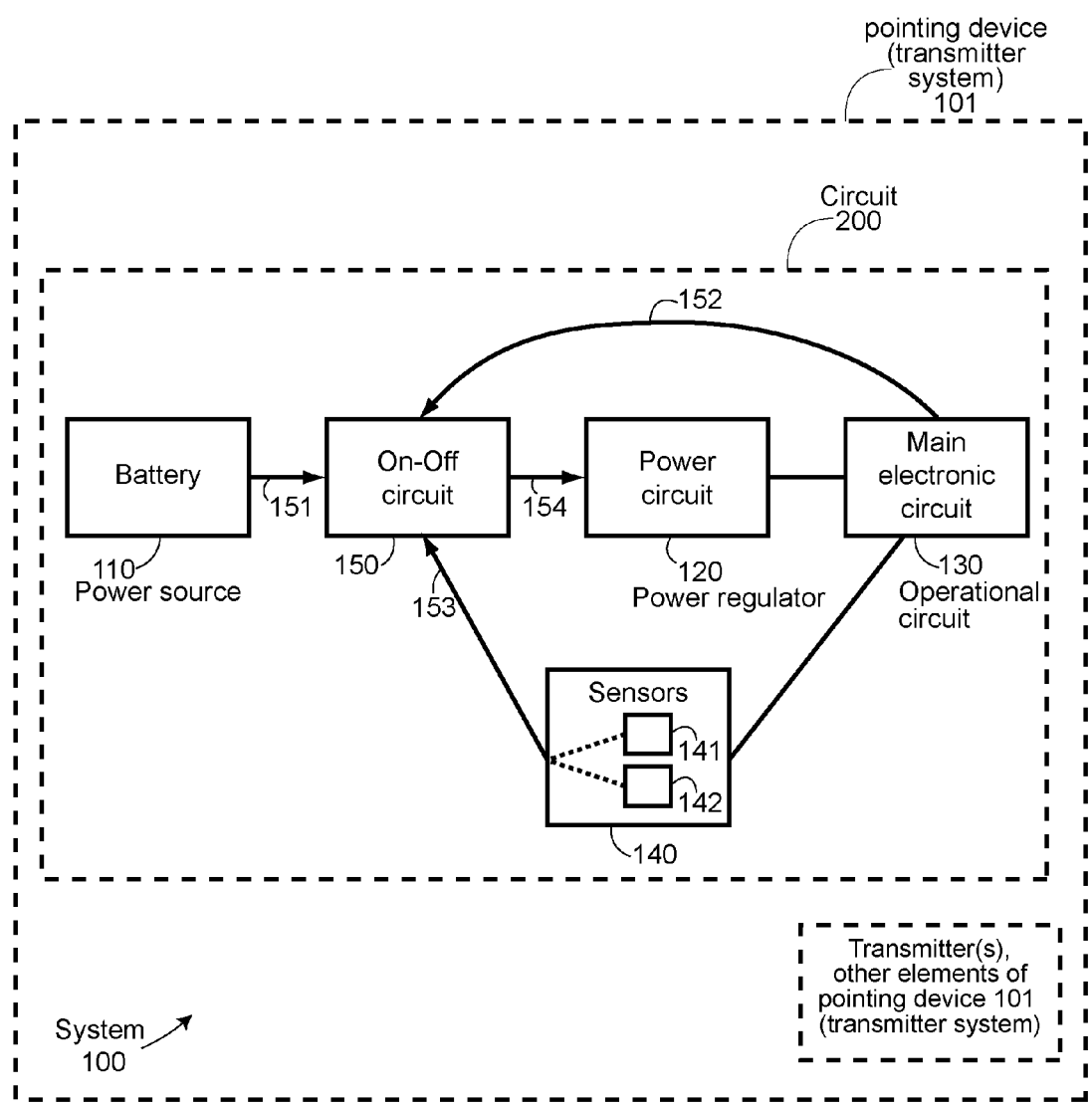
FIG. 1 shows a functional block diagram of a system including an on-off circuit.

This application incorporates the following documents, each of which is hereby incorporated by reference as if fully set forth herein.

U.S. Pat. No. 5,866,856, filed Feb. 28, 1997, in the name of inventor Rafi Holtzman, as application Ser. No. 08/808,524, titled "Marking device for electronic presentation board".

U.S. Pat. No. 6,266,051, filed Nov. 19, 1999, in the name of inventors Rafi Holtzman, as application Ser. No. 09/443,164, titled "Retrofittable apparatus for converting a substantially planar surface into an electronic data capture device".

U.S. Pat. No. 6,335,723, filed Oct. 2, 1998, in the name of inventors Robert P. Wood, Serge Plotkin, Jacob Harel, and Alfred Samson Hou, as application Ser. No. 09/165,748, titled "Transmitter pen location system".

These documents are hereby incorporated by reference as if fully set forth herein, and are sometimes referred to herein as the "incorporated disclosure".

Inventions described herein can be used in combination or conjunction with technology described in the incorporated disclosure.

DETAILED DESCRIPTION OF THE PREFERRED EMBODIMENTS

In the description herein, a preferred embodiment of the invention is described, including preferred circuit elements and operation thereof. Those skilled in the art would realize, after perusal of this application, that embodiments of the invention might be implemented using a variety of other techniques not specifically described, without undue experimentation or further invention, and that such other techniques would be within the scope and spirit of the invention.

Lexicography

The following terms relate or refer to aspects of the invention or its embodiments. The general meaning of each of these terms is intended to be illustrative and in no way limiting.

The phrase "locator system" generally describes any system in which position information about a pointing device, such as for example a transmitter pen, is determined by the system in response to signals between the pointing device and a matching device, e.g., one or more receivers for receiving signals from that transmitter pen, and in which that position information is disseminated. As described in the incorporated disclosure, in one embodiment, not intended to be limiting in any way, the locator system includes a transmitter pen having at least two transmitters, a first one capable of transmitting ultrasonic signals and a second one capable of transmitting infrared signals.

This detailed description describes a portable pointing device that includes a transmitter. Aspects of the invention, are, however not limited to such a pointing device, but are also applicable to a pointing device when in addition to, or instead of transmitting one or more signals to a matching device, receives one or more signals from a matching device, both receives and transmits, or otherwise exchanges signals with other devices. How to modify any aspects are specific to a pointing device with a transmitting system to be applicable to a pointing device with a receiving system would be clear to those in the art Thus, the phrases "portable transmitter" and "transmitter pen" generally describe any device usable for pointing in a locator system, in which the device is portable or movable and in which the system is responsive to movement of the transmitter pen, such as for example by generating graphics usable by display systems.

As described herein, in one embodiment, not intended to be limiting in any way, the transmitter pen might include multiple passive buttons or other sensors, such as for example (1) a pressure switch or a proximity sensor capable of determining when the transmitter pen is approximately touching the active area, and (2) one or more buttons capable of use by a user of the transmitter pen as mouse buttons or other indicators.

The phrase "active area" generally describes any substantially planar surface, whether actually marked on or not, usable with a transmitter pen for writing or drawing in a locator system. The phrase "active area" is broad, and is intended to include surfaces on which actual ink or marking fluid is disposed, as well as surfaces serving as projection backdrops for display of an image usable when writing or drawing. For example, not intended to be limiting in any way, the "active area" might include a physical marking surface, or might include a presentation of a display picture, used as an indicator of a picture, writing, or drawing, that is a subject of presentation, further writing or further drawing.

The phrase "display system" generally describes any system in which position information regarding a transmitter pen is presented in graphical or other visual form, such as for example a computer monitor or projector operating under control of a computing device capable of selecting images or pixels for display.

The scope and spirit of the invention is not limited to any of these definitions, or to specific examples mentioned therein, but is intended to include the most general concepts embodied by these and other terms.

System Elements

FIG. 1 shows a functional block diagram of a system including an on-off circuit.

A system 100 includes a power source 110, a power regulator 120, an operational circuit 130, a plurality of sensors 140, and an on-off circuit 150.

In one embodiment, the power source 110 includes a battery or other stored source of electrical power, such as for example a 1.5 volt battery. Other portable electrical power sources are also acceptable. In the context of the invention, there is no particular requirement for any specific type of electrical power source. For one example, not intended to be limiting in any way, in alternative embodiments, the power source 110 may include an electrical socket or other technique for receiving power from an external source.

After reading this application, those of ordinary skill in the art would realize that use of the 1.5 volt battery is advantageous in the context of a pointing device, or any other portable device, in view of its relatively small size and relatively convenient availability if it is necessary to recharge or replace it. However, many microcontroller circuits involve higher voltage to operate than 1.5 volts, with the effect that the power regulator 120 is used to convert the supplied battery voltage to a relatively higher operating voltage such as 3.3 volts or 5.0 volts. As noted above, while the specific circuit elements described herein are preferred, after reading this application, those of ordinary skill in the art would realize that many alternatives are possible, that such alternatives are within the scope and spirit of the invention, and that such alternatives would not require undue experimentation or further invention.

In one embodiment, the power regulator 120 includes a DC-to-DC converter, such as for example the "Max 1724" part available from Maxim Integrated Products of Sunnyvale, Calif. Other known power converters, regulators, and transducers are also acceptable. In the context of the invention, there is no particular requirement for any specific type of regulator.

In one embodiment, the operational circuit 130 includes a microcontroller and related circuit elements, such as for example the "PIC16C505" microcontroller available from Microchip Technology of Chandler, Arizona. Other microcontrollers are also acceptable. In the context of the invention, there is no particular requirement for any specific type of operational circuit. In fact, the operational circuit need not make any provision for reduced-power operation, with the effect that design of the operational circuit might be substantially simplified.

The plurality of sensors 140 includes at least a first sensor 141 and a second sensor 142, each capable of being triggered in a distinct way. For one example, not intended to be limiting in any way, the first sensor 141 might include a first button capable of being manipulated by a user, and the second sensor 141 might include a second button of a similar type.

In one embodiment, the system 100 is included in a pointing device 101, such as a portable transmitter pen or similar pointing device, and the plurality of sensors 140 includes a plurality of buttons or switches capable of being manipulated or triggered by a user, such as for example a person holding the transmitter pen.

For a first example, a person holding the transmitter pen might deliberately push one of a plurality of buttons to turn on the transmitter pen and to substantially simultaneously achieve some additional function, such as to designate a particular color to render lines "drawn" by the transmitter pen.

For a second example, a person holding the transmitter pen might trigger one of the buttons or switches by pushing the tip of the transmitter pen against the active area, with the effect of triggering a physical switch or a proximity switch and allowing the user to "draw" lines using the transmitter pen. In this second example, the person holding the transmitter pen would also be able to select one or more buttons on the transmitter pen, with an effect similar to clicking a mouse button (e.g., selecting a particular location or object at which to start drawing) and providing a mouse button function. In this second example, there could be a plurality of such buttons, with the effect that the user would have a selection of more than one such mouse button function.

In the context of the invention, there is no particular requirement for any specific type of sensor. Other types of sensor, such as for example sensors that are capable of being activated by electromagnetic effects, by light, by proximity to the active area, by sound, or by other effects, are also acceptable.

In the context of the invention, there is no particular requirement that the first sensor 141 is similar to the second sensor 142. In one embodiment, the first sensor 141 includes a proximity sensor or a touch sensor such as a pressure switch capable of detecting whether the transmitter pen is touching the active area; the second sensor 142 includes a button capable of detecting whether the button is pressed by a user. In alternative embodiments, the first sensor 141 includes a first button and the second sensor 142 includes a second button, the first button and the second button being distinct to the user.

For a first example, not intended to be limiting in any way, a first sensor might indicate when the transmitter pen is pressed to the active area, a second sensor might indicate when the user desires to change color or line type, and a third sensor might indicate when the user wishes to erase (using the transmitter pen to locate what elements to erase). For a second example, not intended to be limiting in any way, the active area might be partitioned by the receiver into a plurality of regions, at least a first of which is used for writing or drawing, and at least a second of which is used for commands to the locator system itself. Other and further examples are also described above.

The on-off circuit 150 includes a first input 151 coupled to the power source 110, a second input 152 coupled to the operational circuit 130, a plurality of third inputs 153 each coupled to a corresponding one of the sensors 140, and an output 154 coupled to the power regulator 120.

The first input 151 is disposed for receiving electrical power from the power source 110. The second input 152 is disposed for receiving a turn-off signal from the operational circuit 130. Each one of the third inputs 153 is disposed for receiving one of a set of turn-on signals from a corresponding one of the sensors 140. The output 154 is disposed for sending an on-off signal to the power regulator 120.

The system 100 is configured to have an inactive state and an active (on) state. The on-off circuit 150 is configured to draw substantially no power (from the first input 151, coupled to the power source 110) while the system is in the inactive state, and to draw a relatively small amount of power while the system is in the on state.

The on-off circuit 150 is configured to turn on, with the effect that the system 100 transitions to its ON state, in response to one of the turn-on signals (from one of the third inputs 153, coupled to a corresponding one of the sensors 140). The on-off circuit 150 is configured to turn off in response to turn-off signal (from the second input 152, coupled to the operational circuit 130), with the effect that the system 100 transitions from its ON state to its inactive state.

After reading this application, those of ordinary skill in the art would understand how the system 100 operates. The following description is only for illustrative purposes.

This arrangement has the effect that the system 100 and the on-off circuit 150 do the following:

The on-off circuit 150 consumes essentially no power when the system 100 is in its inactive state.

The on-off circuit 150 responds to one of the sensors 140 being triggered, causing the system 100 to transition from its inactive state to its ON state. When turned on, the on-off circuit 150 couples power from the power source 110 to the power regulator 120, which applies power to the operational circuit 130.

The on-off circuit 150, in response to the operational circuit 130 deciding that the system 100 can transition to its inactive state (that is, be turned off), causes the system 100 to transition from its on state back to its inactive state.

In one embodiment, the system 100 might exhibit one or more intermediate states, in which more power is consumed than in the inactive state but less power is consumed than in the on state, in response to one or more signals from the operational circuit 130. As further described below with regard to FIG. 3 and FIG. 4, these intermediate states preferably include an IDLE state and a SHUT-DOWN state.

This arrangement has the effect that the system 100 uses a relatively minimal amount of power.

Circuit Elements

Figure 2:
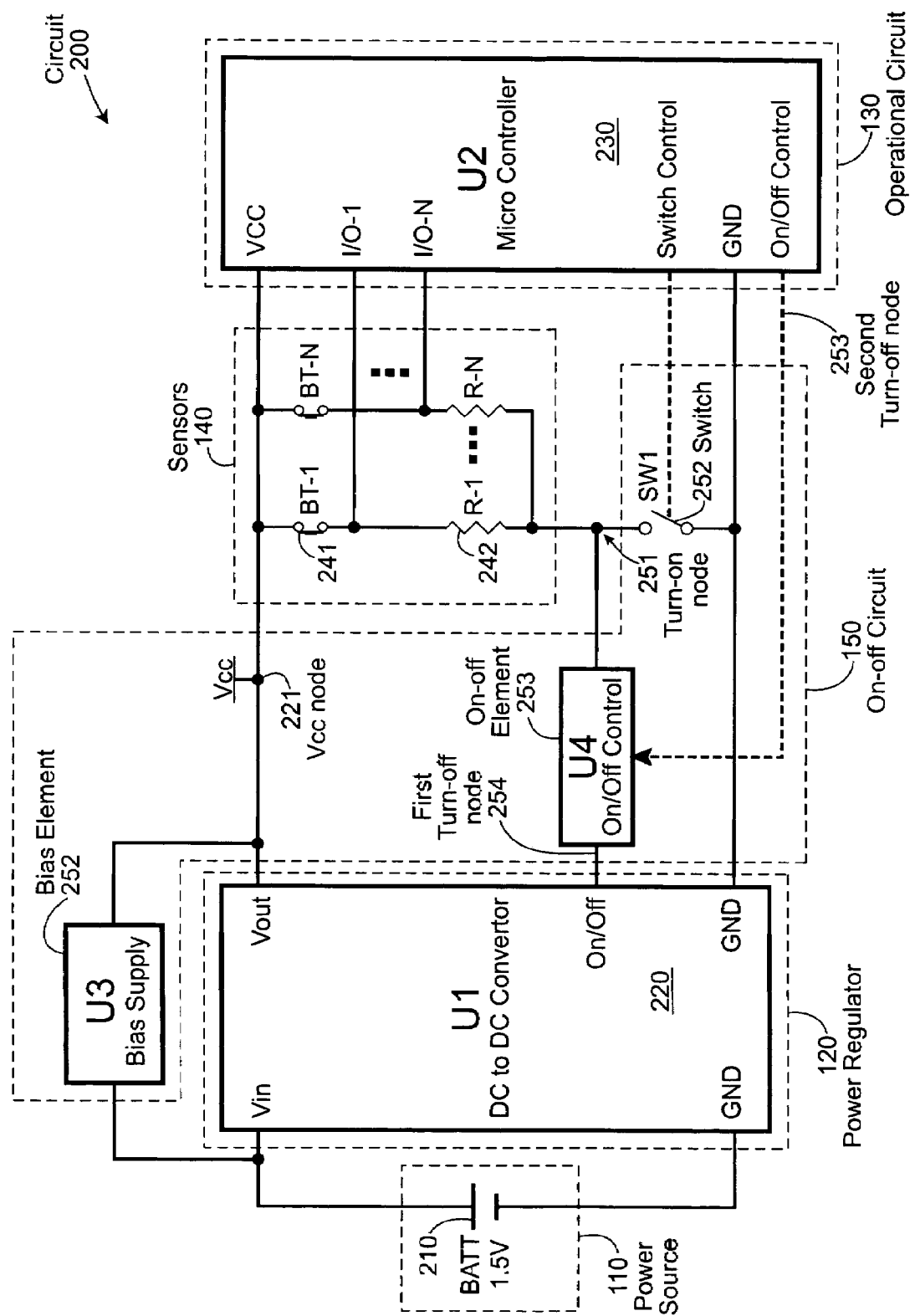
FIG. 2 shows a circuit block diagram of a system including an on-off circuit.

FIG. 2 shows a circuit block diagram of a system including an on-off circuit.

The system 100 includes a circuit 200, which includes the power source 110, the power regulator 120, the operational circuit 130, the plurality of sensors 140, and the on-off circuit 150.

The power source 110 includes a battery 210 (also labeled BATT in the figure). In one embodiment, the battery 210 includes a 1.5 volt AA battery providing DC power.

The power regulator 120 includes a DC-to-DC converter 220 (also labeled U1 in the figure). A first terminal of the battery 210 is coupled to a $V_{in}$ input of the DC-to-DC converter 220; a second terminal of the battery 210 is coupled to a ground input (labeled GND in the figure) of the DC-to-DC converter 220. The DC-to-DC converter 220 converts unregulated 1.5 volt DC power from the battery 210 into regulated 5 volt $V_{cc}$ power for use by the operational circuit 130. The DC-to-DC converter 220 also has a $V_{cc}$ output (labeled $V_{out}$ in the figure, and shown coupled to a $V_{cc}$ node 221) and a ground output (labeled GND in the figure).

As noted above, in one embodiment, the $V_{cc}$ output of the DC-to-DC converter 220 is a relatively higher voltage than the 1.5 volts provided by the battery 210, e.g., 5 volt $V_{cc}$ power for use by the operational circuit 130.

The operational circuit 130 includes a microcontroller 230 (also labeled U2 in the figure). The microcontroller 230 operates under control of firmware or software maintained in a memory. In one embodiment, the memory might be included in the same chip or package as the microcontroller 230. A $V_{cc}$ input of the microcontroller 230 is coupled to the $V_{cc}$ node 221; a ground input (labeled GND in the figure) of the microcontroller 230 is coupled to the ground output of the DC-to-DC converter 220.

Each one sensor of the sensors 140 includes a corresponding switch 241 (also labeled BT-1 . . . BT-N in the figure) and a corresponding resistor 242 (also labeled R-1 . . . R-N in the figure) coupled in series with its corresponding switch 241. Each switch 241 is coupled to the $V_{cc}$ node 221 and to a corresponding signal input of the microcontroller 230 (also labeled I/O-1 . . . I/O-N in the figure). Each resistor 242 is coupled to its corresponding signal input of the microcontroller 230 and to a turn-on node 251 included in the on-off circuit 150.

The turn-on node 251 is coupled to a control input of the on-off circuit 150, and to a first terminal of a switch 252 (also labeled SW1 in the figure). A second terminal of the switch 252 is coupled to the ground output of the DC-to-DC converter 220. A control terminal of the switch 252 is coupled to a control output of the microcontroller 230 (also labeled "switch control" in the figure).

The on-off circuit 150 includes the turn-on node 251, a bias element 256 (also labeled U3 in the figure), an on-off element 253 (also labeled U4 in the figure), a first turn-off node 254, and a second turn-off node 255. The turn-on node 251 is coupled to an input of the on-off element 253, and is disposed for causing the on-off element 253 to turn on. The first turn-off node 254 is coupled to an output of the on-off element 253 and to an on-off pin of the DC-to-DC converter 220, which is disposed for turning the DC-to-DC converter 220 on or off, according to a signal at the on-off pin. The second turn-off node 255 is coupled to an input of the on-off element 253 and to an output (also labeled "on/off control" in the figure) of the microcontroller 230.

As further described herein, the on-off circuit 150 has relatively simple functionality, and can be implemented using a relatively simple circuit. For a first example, not intended to be limiting in any way, the on-off circuit 150 might include a simple latch or register, with the effect that a content of that latch or register would indicate whether the on-off circuit 150 is on or off, and with the effect that a content of that latch or register would indicate whether the system 100 is in its inactive state or its ON state. For a second example, not intended to be limiting in any way, the on-off circuit 150 might include a finite state machine (which could itself include a relatively small set of simple latches or registers, along with a relatively small amount of logic circuitry). In one embodiment, the on-off circuit 150 consumes substantially no power when turned off (that is, when the system 100 is in its inactive state).

A first terminal of the bias element 256 is coupled to the $V_{in}$ input of the DC-to-DC converter 220; a second terminal of the bias element 256 is coupled to the $V_{cc}$ node 221.

Method of Operation

Figure 3:
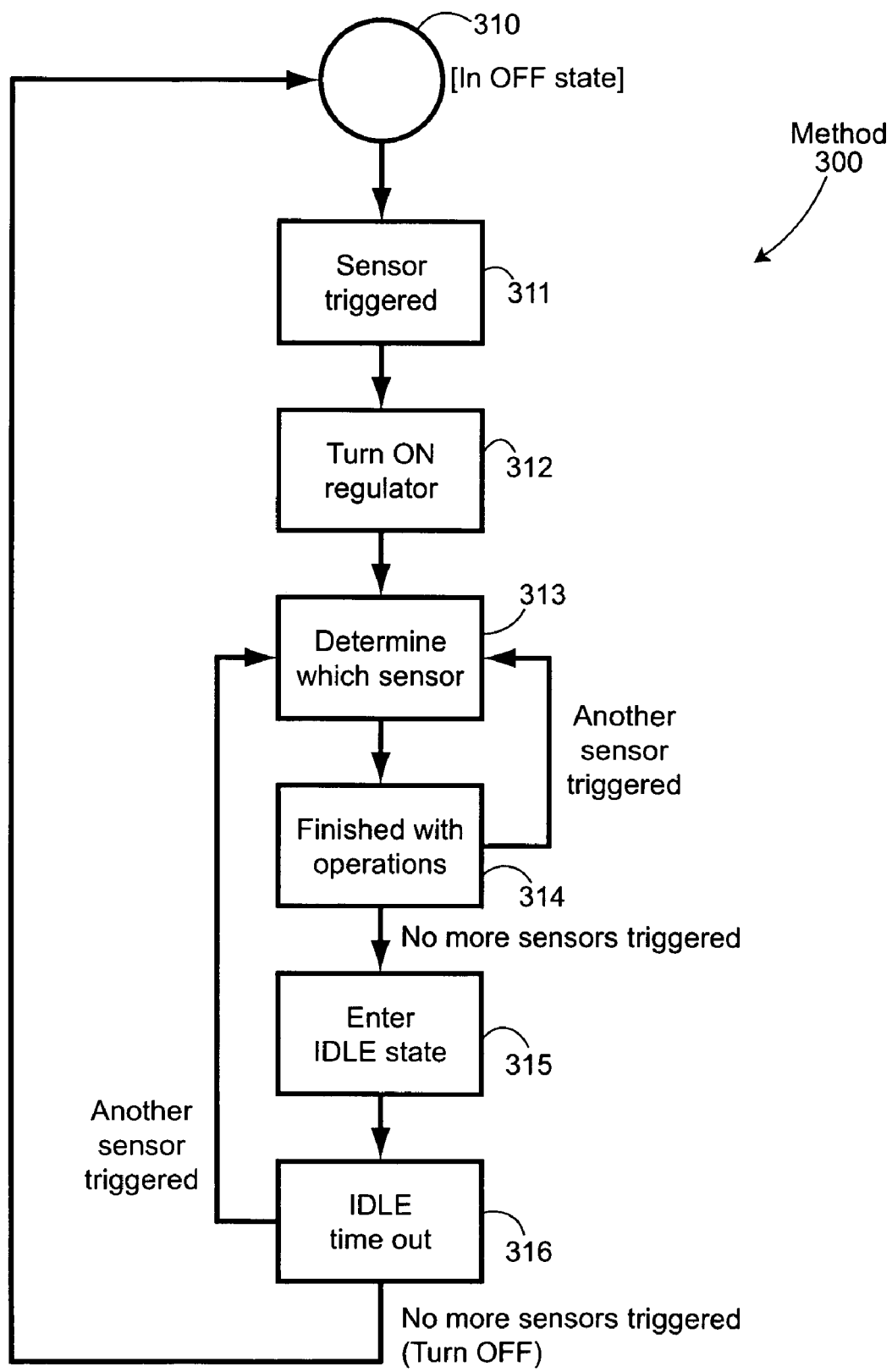
FIG. 3 shows a process flow diagram of a method of operating a system including an on-off circuit.

FIG. 3 shows a process flow diagram of a method of operating a system including an on-off circuit.

After reading this application, those of ordinary skill in the art would understand how the circuit 200 operates. The following description is only for illustrative purposes:

Although described serially, the flow points and steps of a method 300 performed by the circuit 200 are in many cases performed by separate elements substantially concurrently. There is no particular requirement that the method 300 must be performed in the same order in which this description lists flow points or steps, except where explicitly so indicated.

At a flow point 310, the circuit 200 is in its inactive (OFF) state, and the output of the DC-to-DC converter 220 at the $V_{cc}$ node 221 is at a relatively low voltage $V_{bias}$.

The bias element 256 is configured so that (A) $V_{bias}$ is low enough that the operational circuit 130 remains substantially off and consumes substantially no current or power; (B) $V_{bias}$ is high enough to turn on the DC-to-DC converter 220 if any of the switches 241 is closed (that is, if the switch 241 includes a button, the button is pressed; if the switch 241 includes a sensor, the sensor detects its sensed effect). This has the effect that switch 252 remains open.

In one embodiment, $V_{bias}$ is selected to have a voltage having the effect of providing a current of about 0.5 microamps ($\mu$A), and might have a voltage between about 1.0 and about 1.5 volts.

After reading this application, those skilled in the art would realize that the particular voltage $V_{bias}$ has the effect of drawing substantially no power by the DC-to-DC converter 220, or any other element of the system 100, with the effect that the system 100 collectively draws substantially no power when in its substantially off state.

At a step 311, one or more of the sensors 140 is triggered. When any of the sensors 140 is triggered, its corresponding switch 241 will become closed. This has the effect that a first power circuit is formed, in which current flows from the battery 210, to the bias element 256, to the corresponding switch 241, to the corresponding resistor 242, to the first turn-on node 254, to the on-off element 253.

At a step 312, the on-off element 253 triggers the on-off pin of the DC-to-DC converter 220, which turns on the DC-to-DC converter 220, which causes the $V_{cc}$ node 221 to reach an ON voltage of 5 volts. This has the effect that the microcontroller 230 turns on, and the system 100 transitions to its ON state.

The microcontroller 230 allows current to flow through the second turn off node 255 and the on-off element 253, turns on first turn on node 254, and enables the DC-to-DC converter 220 during the active, idle and shut-down states. The microcontroller 230 also closes switch 252 and brings the node 251 to ground, with the effect of isolating the sensors 140 from the turn on node 254.

At a step 313, the microcontroller 230, being coupled to each of the signal inputs corresponding to the corresponding switch 241 for the triggered sensor 140, can examine the voltage drop formed across the corresponding resistor 242, and thus determine which one of the sensors 140 was triggered. The microcontroller 230, in response to which one of the sensors 140 was triggered, determines which operations it should perform.

At a step 320, the circuit 200 handles an unintended event that might occur when a switch, e.g. BT-1 in sensor 140 is being substantially continuously triggered (for example, a button is being held down, or the pointing device is being held against the active area for more than a designed time), the microcontroller 230 shuts down other peripherals except the DC-to-DC converter 220 and a watchdog timer inside the microcontroller 230.

As part of the step 320, if the same sensor is substantially continuously triggered for more than a designated timeout, the circuit 200 proceeds with the step 321, with the effect of entering the shut-down state.

At the step 321, in the shut-down state, as further described herein, the circuit 200 consumes less than 80 microamps of current. The circuit 200 exits the shut-down state and proceeds with the step 313 after a designated watchdog time to check the status of the sensor 140 that was substantially continuously triggered.

If no sensor 140 is substantially continuously triggered, or if the sensor that was being substantially continuously triggered is no longer being substantially continuously triggered (such as because that particular sensor 140 has been released, or because a different sensor 140 is triggered instead, or simply because it was the first time the sensor 140 was being triggered from the off mode), the circuit 200 proceeds with a step 314. At the step 314, the microcontroller 230 completes the operations it determined to perform in the previous step 313. The microcontroller 230, still being coupled to each of the signal inputs, can determine if, while the previous step was being performed, any of the sensors 140 has been triggered, or is still being triggered. As noted in the figure, in the on state, the circuit 200 consumes about 15 milliamps of current.

At a step 331, the method 300 determines if any of the sensors 140 has been triggered, or is still being triggered, and if so, the method 300 proceeds with the step 313.

If not, the method 300 proceeds with the next step 315, with the effect of entering the idle state, and shuts down other peripherals except DC-to-DC converter 220 and the watchdog timer in the microcontroller 230. At the step 315, the method 300 waits for the watchdog timer in the microcontroller 230 to count down the designated idle state time, after which the method 300 proceeds with the step 331, with the effect of determining if any sensor 140 is detected after the watchdog time is over.

In one embodiment, the watchdog time duration for the SHUT-DOWN and IDLE states is about 18 milliseconds (ms), and the amount of current drawn in the SHUT-DOWN state is about 80 microamps (µA).

In one embodiment, the selected time duration for IDLE state is about 6 minutes, that is, 360 seconds, and the amount of current drawn in the IDLE state is about 70 microamps (µA).

At a step 316, if the selected time duration for IDLE state has not passed, the microcontroller 230 performs the step 331. If any of the sensors 140 has been triggered, the method 300 proceeds with the step 313. If the selected time duration for IDLE state has passed, the method 300 proceeds with the step 332, with the effect that the IDLE state has been timed out.

At a step 332, the microcontroller 230, having determined that no further sensors 140 have been triggered, and having also determined that the selected time duration for IDLE state has passed, causes the second turn-off node 255 to indicate that the on-off circuit 150 should be turned off and the system 100 should enter its inactive state. The microcontroller 230 causes the switch 252 to become open. This has the effect that the voltage at $V_{cc}$ node 221 decays to the relatively low voltage $V_{bias}$.

The method 300 returns to the flow point 310.

State Transitions

Figure 4:
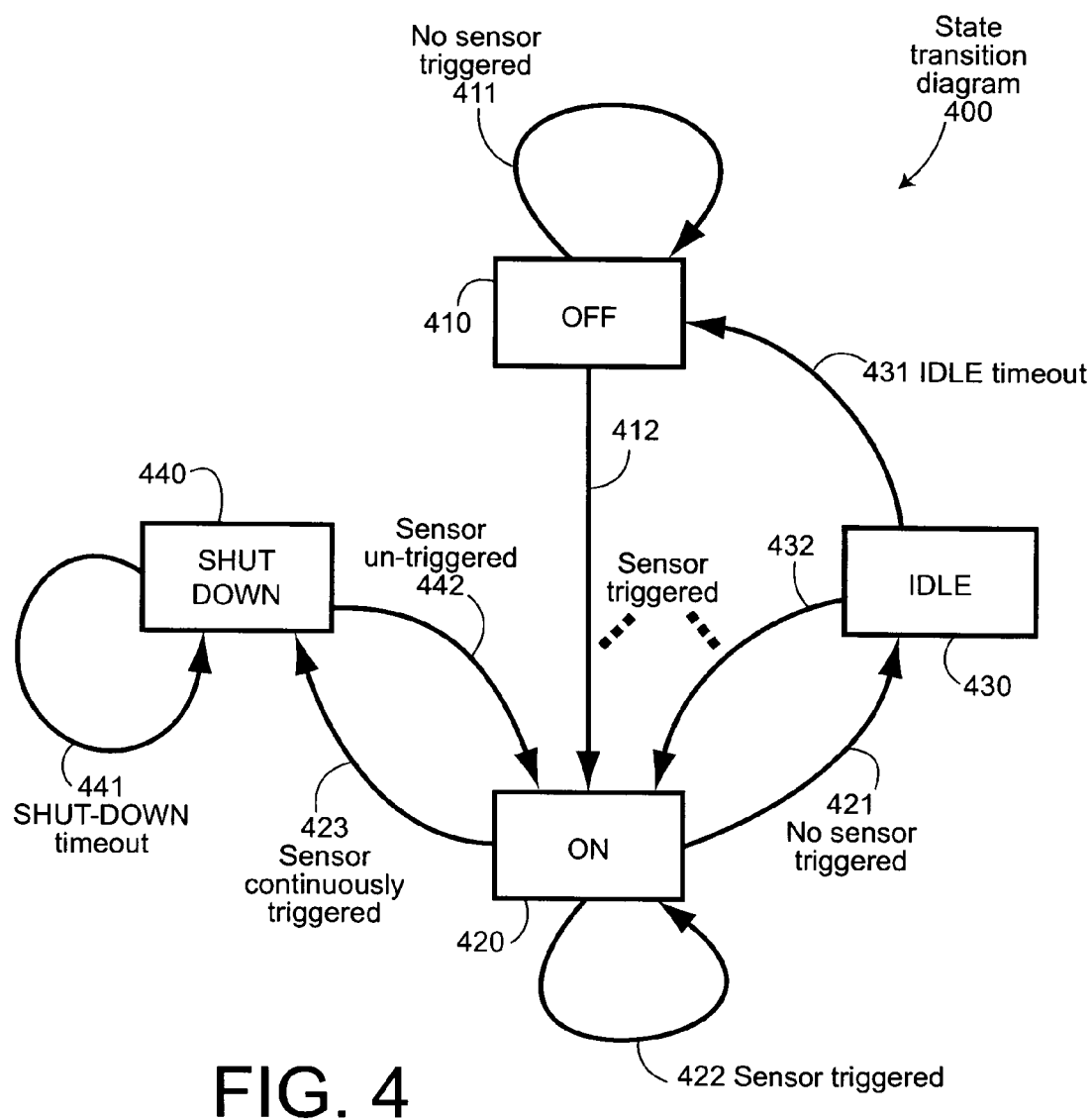
FIG. 4 shows a state transition diagram of a method of operating a system including an on-off circuit.

FIG. 4 shows a state transition diagram of a method of operating a system including an on-off circuit.

A state transition diagram 400 includes an OFF state 410, an ON state 420, an IDLE state 430, and a SHUT-DOWN state 440. In one embodiment, the system 100 (and thus the circuit 200) is at all times in one of these states.

Regarding the OFF state 410, the state transition diagram 400 includes a no-sensor transition 411 and a sensor-triggered transition 412. If no sensor 140 is triggered, the no-sensor transition 411 is taken and the system 100 remains in the OFF state 410. If any sensor 140 is triggered, the sensor-triggered transition 412 is taken and the system 100 enters the ON state 420.

Regarding the ON state 420, the state transition diagram 400 includes a no-sensor transition 421, a sensor-triggered transition 422, and a continuous-trigger transition 423. If no sensor 140 is triggered, the no-sensor transition 421 is taken and the system 100 enters the IDLE state 430. If a new sensor 140 is triggered or the same sensor 140 is triggered a separate time, the sensor-triggered transition 422 is taken and the system 100 remains in the ON state 420. If any sensor 140 is substantially continuously triggered, the continuous-trigger transition 423 is taken and the system enters the SHUT-DOWN state 440.

Regarding the IDLE state 430, the state transition diagram 400 includes a time-out transition 431 and a sensor-triggered transition 432. If no sensor 140 is triggered for the duration of the selected idle time (360 seconds), the time-out transition 431 is taken and the system 100 enters the OFF state 410. If any sensor 140 is triggered before the selected idle time, the sensor-triggered transition 432 is taken and the system 100 enters the ON state 420.

Regarding the SHUT-DOWN state 440, the state transition diagram 400 includes a time-out transition 441 and a sensor-not-triggered transition 442. If the same sensor 140 is substantially continuously triggered for the duration of the selected shut-down time (60 seconds), the time-out transition 441 is taken and the system 100 remains in the SHUT-DOWN state 440. If the same sensor 140 becomes untriggered, or a different sensor 140 is triggered instead, the sensor-not-triggered transition 442 is taken and the system enters the ON state 420.

ALTERNATIVE EMBODIMENTS

Although preferred embodiments are disclosed herein, many variations are possible which remain within the concept, scope, and spirit of the invention. These variations would become clear to those skilled in the art after perusal of this application.

After reading this application, those skilled in the art would also recognize that the techniques described herein provide an enabling technology, with the effect that heretofore advantageous features can be provided that heretofore were substantially infeasible.

After reading this application, those skilled in the art will recognize that any described alternative embodiments and variations are illustrative and are intended to be in no way limiting.

The invention claimed is:

1. In a system included in a pointing device, the system having an inactive state and an on state, apparatus including:
   a set of at least one sensor associated with the pointing device, each sensor being one of a proximity sensor, a touch sensor operative to detect whether the pointing device is touching an active area, or a button sensor operative to detect whether a button is pressed by a user;
   an on-off circuit coupled to the set of sensors and responsive to a triggering event involving any of those sensors;
   a regulator coupled to the on-off circuit, responsive to a signal from the on-off circuit, and capable of being turned on or off in response to that signal; and
   an operational circuit coupled to the set of at least one sensor and to the regulator, the operational circuit being responsive to whether the regulator is on or off, wherein the operational circuit can determine which one or more of the set of sensors is involved in any such triggering event;

wherein each sensor of the set of at least one sensor includes a passive switch coupled to a corresponding resistor and a power source, such that for each particular sensor, no power is consumed by the particular sensor and its corresponding resistor unless there is a triggering event for the particular sensor, and such that as a result of a triggering event for the particular sensor, there is a current flowing through the corresponding resistor, wherein for each particular sensor, a sensor signal indicative of a voltage drop across the resistor corresponding to the particular sensor coupled to the operational circuit operative to indicate that there has been a triggering event, and wherein the system consumes substantially no power in its inactive state and operates normally in its on state.

2. Apparatus as in claim 1, wherein at least one of the following circuits consumes no more than about 1.5 microamp when the regulator is in its inactive state: the on-off circuit, the regulator, the operational circuit.

3. Apparatus as in claim 1, wherein the on-off circuit includes:
- a bias element coupled to the set of sensors and providing substantially less than the full power output of the regulator;
- each sensor of the set of sensors being coupled to a distinguishable input of the operating circuit; and
- a switch coupled to the bias element, responsive to such a triggering event, and generating a signal from each of the sensors to the operating circuit.

4. Apparatus as in claim 1, wherein the on-off circuit is responsive to a turn-off signal from the operational circuit, and capable of being turned off in response to that turn-off signal.

5. Apparatus as in claim 1, wherein the system includes a shut-down state, the system entering the shut-down state in response to the operational circuit having detected one of the sensors having been associated with such a triggering event for at least a known time duration.

6. Apparatus as in claim 1, wherein the system includes an idle state, the system entering the idle state in response to the operational circuit having detected none of the set of one or more sensors having been associated with such a triggering event for a known time duration.

7. Apparatus as in claim 1, wherein the set includes more than one sensor.

8. Apparatus as in claim 1, wherein the pointing device is a non-marking pointing device.

9. Apparatus as in claim 1, wherein the pointing device is a marking pointing device.

10. In a system included in a pointing device having a plurality of sensors, apparatus including:
- a power source;
- a regulator coupled to the power source;
- an operational circuit coupled to the regulator;
- a first sensor and a second sensor, each coupled to the operational circuit, each sensor being one of a proximity sensor, a touch sensor operative to detect whether the pointing device is touching an active area, or a button sensor operative to detect whether a button is pressed by a user; and
- an on-off circuit coupled to the regulator, the first sensor, and the second sensor; wherein the on-off circuit has an inactive state and an active state;
the on-off circuit uses substantially no energy in its inactive state;
the on-off circuit is capable of a transition from its inactive state to its active state in response to either the first sensor or the second sensor;
the on-off circuit is capable of distinguishing, substantially immediately upon transition from the inactive state, whether that transition was in response to the first sensor or the second sensor,
wherein each sensor includes a passive switch coupled to a corresponding resistor and the power source, such that for each particular sensor, no power is consumed by the particular sensor and its corresponding resistor unless there is a triggering event for the particular sensor, and such that as a result of a triggering event for the particular sensor, there is a current flowing through the corresponding resistor, and
wherein for each particular sensor, a sensor signal indicative of a voltage drop across the resistor corresponding to the particular sensor coupled to the operational circuit.

11. Apparatus as in claim 10, wherein
the regulator has an inactive state and an active state;
the on-off circuit is capable of changing the regulator from its inactive state to its active state; and
the regulator uses substantially no energy in its inactive state.

12. Apparatus as in claim 10, wherein
the on-off circuit is coupled to the operational circuit; and
the on-off circuit is responsive to a signal from the operational circuit, wherein the on-off circuit is capable of transitioning from its active state to its inactive state in response to that signal.

13. Apparatus as in claim 10, wherein the on-off circuit is coupled to the power source.

14. A method operative in a system included in a pointing device having a set of one or more sensors, the method including the steps of:
receiving a relatively low voltage, the relatively low voltage being substantially less than a normal regulated voltage, but being sufficient to generate current in response to a triggering event involving any one or more of a plurality of sensors, each sensor being one of a proximity sensor, a touch sensor operative to detect whether the pointing device is touching an active area, or a button sensor operative to detect whether a button is pressed by a user, each particular sensor including a passive switch coupled to a corresponding resistor and a power source of the relatively low voltage, such that for each particular sensor, no power is consumed by the particular sensor and its corresponding resistor unless there is a triggering event for the particular sensor, and such that as a result of a triggering event for the particular sensor, there is a current flowing through the corresponding resistor;
responsive to such a triggering event, generating a normal regulated voltage;
coupling each of the sensors to an operating circuit by a coupling of the resistor corresponding to the sensor to the operational circuit, the coupling operative to detect a voltage drop across the resistor corresponding to the sensor, such that the operating circuit generates, in response to the normal regulated voltage, a signal indicative of which sensor was involved in the triggering event.

15. A method as in claim 14, wherein the steps of generating include steps of
altering a state of a switch in response to the triggering event; and completing a circuit including that relatively low voltage and that switch, whereby a regulator receives a turn-on signal.

16. A method as in claim 14, wherein the steps of receiving include steps of coupling a bias element from a power source to an output of a regulator while that regulator is off.

17. A method as in claim 14, whereby the coupling includes:
- coupling each of the sensors between the power source of the relatively low voltage and the corresponding resistor;
- coupling each of the corresponding resistors to a common node, such that the triggering event presents at least some current to the common node;
- altering a state of a switch in response to that current, whereby that current presents a detectable voltage across the one resistor corresponding to which sensor was involved in the triggering event.

18. A method as in claim 14, wherein the set includes more than one sensor.

19. In a system included in a pointing device having a set of one or more sensors, a circuit including:
- a relatively low voltage, the relatively low voltage being substantially less than a normal regulated voltage, whereby an operational circuit consumes substantially no power in response to the relatively low voltage;
- wherein each of the set of one or more sensors is coupled to the relatively low voltage and is coupled to an identifiable resistive element, whereby the relatively low voltage generates a turn-on current through one of the identifiable resistive elements in response to a triggering event involving any of the set of one or more sensors, each sensor being one of a proximity sensor, a touch sensor operative to detect whether the pointing device is touching an active area, or a button sensor operative to detect whether a button is pressed by a user;
- a regulator coupled to that turn-on current, the regulator being responsive to that turn-on current to turn on and provide the normal regulated voltage;
- coupling each of the identifiable resistive elements to an operating circuit, whereby the operating circuit generates, in response to the normal regulated voltage, a signal indicative of which sensor was involved in the triggering event,
- wherein each sensor includes a corresponding on-off switch such that the combination of the sensor and its corresponding resistor consumes no power unless the sensor is triggered.

20. A circuit as in claim 19, wherein the relatively low voltage has the effect of providing a current of about 0.5 microamps when none of the sensors are triggered.

21. A circuit as in claim 19, wherein the set includes more than one sensor.

22. In a system included in a pointing device having a set of at least one sensor, a circuit including:
- a power source;
- a bias element;
- a switch corresponding to each sensor, the switch being closed when the sensor is triggered and open when the sensor is not triggered, each sensor being one of a proximity sensor, a touch sensor operative to detect whether the pointing device is touching an active area, or a button sensor operative to detect whether a button is pressed by a user;
- a resistive element corresponding to each such switch;
- an operational circuit coupled to each such resistive element;
- a node coupled to a plurality of those resistive elements; and
- an on-off element responsive to a voltage at that node;
- whereby the on-off element is responsive to any of the sensors being triggered, and a voltage drop across an identifiable one of the resistive elements allowing operational circuit to generate a signal indicative of which one of the sensors was triggered,
- wherein each sensor includes a corresponding on-off switch such that the combination of the sensor and its corresponding resistor consumes no power unless the sensor is triggered.

23. A circuit as in claim 22, wherein the set includes more than one sensor.

* * * * *